United States Patent [19]
White et al.

[11] Patent Number: 5,721,858
[45] Date of Patent: Feb. 24, 1998

[54] VIRTUAL MEMORY MAPPING METHOD AND SYSTEM FOR MEMORY MANAGEMENT OF POOLS OF LOGICAL PARTITIONS FOR BAT AND TLB ENTRIES IN A DATA PROCESSING SYSTEM

[75] Inventors: Steven W. White; G. Jeannette McWilliams, both of Austin; Jack Wayne Kemp, Round Rock, all of Tex.

[73] Assignee: International Business Machines Corporation, Armonk, N.Y.

[21] Appl. No.: 571,066

[22] Filed: Dec. 12, 1995

[51] Int. Cl.$^6$ .................................................. G06F 00/00
[52] U.S. Cl. .................. 395/413; 395/410; 395/412; 395/416; 395/417; 395/418
[58] Field of Search ................... 395/418, 417, 395/413, 410, 416, 119, 427, 412

[56] References Cited

U.S. PATENT DOCUMENTS

| | | | |
|---|---|---|---|
| 5,442,766 | 8/1995 | Chu et al. | 395/414 |
| 5,450,558 | 9/1995 | Ludwig | 395/418 |
| 5,535,351 | 7/1996 | Peng | 395/417 |

*Primary Examiner*—David K. Moore
*Assistant Examiner*—Than V. Nguyen
*Attorney, Agent, or Firm*—Richard A. Henkler; Brian F. Russell; Andrew J. Dillon

[57] ABSTRACT

A method and system for memory management and address translation mapping of pools of logical partitions for BAT and TLB entries in a data processing system is provided. An entry in an address translation buffer is created that is associated with a particular block of virtual memory comprised of a plurality of logical partitions that are grouped in one or more pools of logical partitions, wherein the size of each pool of logical partitions is equal to a preselected page size for real memory, and wherein the entry maps each pool of logical partitions to a page of real memory within a sector of real memory, wherein the size of the sector is a function of the size of the associated block of virtual memory. When a logical partition belonging to a particular pool of logical partitions within the particular block of virtual memory is received, the received logical partition is stored in the page of real memory mapped to the particular pool of logical partitions by the entry associated with the particular block of virtual memory. When a logical address for a memory reference to a selected logical partition of a particular block of virtual memory is received, a physical address for the selected logical partition is compiled from an entry of the address translation buffer that is associated with the particular block of virtual memory. The physical address is compiled to address the page in real memory mapped to the pool of logical partitions containing the selected logical partition. The data of real memory in the selected logical partition at the compiled physical address is then retrieved.

14 Claims, 3 Drawing Sheets

VIRTUAL MEMORY MAPPING METHOD AND SYSTEM FOR MEMORY MANAGEMENT OF POOLS OF LOGICAL PARTITIONS FOR BAT AND TLB ENTRIES IN A DATA PROCESSING SYSTEM

CROSS-REFERENCE TO RELATED APPLICATION

The present application is related to U.S. patent application Ser. No. 08/570,957, entitled "Virtual Memory Mapping Method and System For Address Translation Mapping of Logical Memory Partitions for BAT and TLB Entries In A Data Processing System", attorney docket no. 0116AD-AA9-95-031, filed of even date herewith by the Inventors hereof and assigned to the assignee herein.

BACKGROUND OF THE INVENTION

1. Technical Field

The present invention relates in general to a virtual memory mapping system in a data processing system, and in particular to an improved virtual memory mapping system in a data processing system having cached address translation mapping of memory references. Still more particularly, the present invention relates to an improved virtual memory mapping system in a data processing system having fine granularity of cached address translation mapping of memory blocks.

2. Description of the Related Art

A computer system typically includes a processor coupled to a hierarchially staged storage system. The computer's hierarchy of storage devices comprises primary memory that includes internal components such as the CPU registers, cache memory, and main memory, and secondary memory that includes any external storage devices such as disks or tapes. Main memory is typically a DRAM or a SRAM. Computers often use an intermediate high-speed buffer called a cache memory that resides between the external devices and main memory or between main memory and the CPU. Cache memories speed up the apparent access times of the slower memories by holding the words that the CPU is most likely to access. The hardware can dynamically allocate parts of the memory within the hierarchy for addresses deemed most likely to be accessed soon.

Most computers use a multilevel storage system that operates as a virtual memory. In such systems, most programs are stored on an external device, such as a hard disk. In practice, the logical-address space of many computers is much larger that their physical-address space in main memory. For example, if a byte-addressed computer uses a 32-bit address, its logical address space has $2^{32}$ memory locations, which is four gigabytes (GB). The operating system loads the program into the main memory in parts or pages, as demanded for execution. By using virtual memory paging, the computer loads into main memory only those parts of a program that it currently needs for execution. The remainder of the program resides in external storage until needed. Thus, one of the biggest advantages of virtual memory is that because programs are stored on secondary storage devices, the size of a program that may be executed is limited not by the size of main memory but rather by the size of the computer's logical-address space.

Because various blocks of memory may be stored throughout the memory hierarchy, a program's logical addresses to particular instructions or data may no longer correspond to the physical addresses for the particular block of memory containing those instructions or data. In a virtual memory system, the operating system maintains special tables that keep track of where each part of the program resides in main memory and in external storage. The memory map between logical-address space and physical-address space is maintained in a page frame or block table having a plurality of entries, each table entry holding information about a specific page or block of memory. Thus, the CPU uses address translation mapping from the tables to translate the program's effective (or logical) addresses into their corresponding physical addresses. Most virtual memory systems keep these translation tables in main memory, and maintain a translation table base register that points to the translation table in memory. Depending upon the configuration, separate tables may exist for the block table and the page frame table.

Virtual memory hardware divides logical addresses into two parts-the virtual block (page) number (the high-order bits), and the word offset (the low-order bits). The virtual block (page) number serves as an offset into the block (or page frame) table. Therefore, when the system loads a block (or page) into memory, it always places the block beginning at a block boundary. A typical table entry includes a validity bit, which indicates whether the block is in main memory, a dirty bit, which indicates whether the program has modified the block, protection bits, which indicate which users may access the page or block of memory and how, and the page-frame or real block number (i.e., the physical address) for the block of memory, if the block (or page) is in main memory.

To minimize the amount of time required to translate a virtual address to a real address, virtual memory mapping generally uses address translation buffers to cache information for recently translated pages. Each entry of an address translation buffer holds a real block number and the same information contained in the translation table, including the validity bit for the block, a dirty bit, protection bits, and the virtual block number to provide the map of the virtual block number to the real block number. In paging virtual memory systems, this address translation buffer is called a translation lookaside buffer (TLB). In addition, some virtual memory systems provide an additional address translation buffer called a block address translation (BAT) buffer, which includes an additional field indicating the size of the block of memory mapped by the entry to support variable sized blocks.

In operation, whenever the CPU generates an effective address, it is sent to the TLB and the BAT, which produce the real page frame or BAT block number, if either buffer holds an entry for the referenced block of memory. If one of the address translation buffers has an entry for the reference, the effective address is translated into the physical address by concatenating the real block number held in the entry with the word offset of the effective address. If the TLB or BAT has no entry for the referenced block of memory, the hardware (or software) consults the translation table in main memory by using the virtual block number as an offset into the translation table. If the validity bit for the entry in the translation table indicates the block is in memory, the hardware copies the translation table entry into the TLB and uses the real block number to access the memory. Otherwise, the hardware initiates a trap called a page or BAT block fault, at which point the operating system intervenes to load the demanded block of memory into main memory and updates the translation table and address translation buffers. A block or page fault is an exception that instructs the operating system to load into main memory the requested or demanded block or page and to update the memory map.

In many systems, the page size is 4 kilobytes (4 KB) and there are 256 or fewer TLB entries. Consequently, the maximum amount of real storage covered by cached page translation information is often 1 MB or less. Consequently, it is unlikely that TLBs for 4 KB pages will ever cover significant portions of large (512 MB–4 GB) main memories. These TLBs are even inadequate to prevent significant performance degradation due to TLB misses while accessing data which fits in a large (4 MB–16 MB) Level Two (L2) cache. As real memory capacities, program footprints, and user working sets continue to grow, it is beneficial to increase the amount of real memory covered by cached translation information. Three common approaches to increasing the coverage are 1) increasing the number of TLB entries, 2) supporting larger pages, and 3) adding BAT facilities to augment the TLBs.

Increasing the number of TLB entries becomes expensive, both in terms of chip area and time to search for a match. Increasing the page size to 1 MB is one way to allow a limited number (64–256) of TLB entries to cover not only the L2 cache but large portions of main memory; however, the larger granularity of storage blocks and memory mapping creates great inefficiencies.

BAT facilities are an alternative, and more common way of providing many of the coverage benefits of large pages. BAT registers, which are set by the operating system, in contrast to TLB entries, which are typically reloaded by hardware, specify the translation for a block of storage which is large relative to a 4 KB page. Unlike TLB entries which typically translate a fixed-size block (a page) of storage, bits in the BAT registers allow a specification of a range roughly equivalent to 50–5000 (4 KB) pages. Both large pages and BAT blocks must be on a boundary similar to the size of the page or block in both address spaces (i.e., a 2 MB block must be on a 2 MB boundary). While large pages or large BAT blocks can alleviate the pressure for more TLB entries, the larger blocks of memory create operating system complexities and granularity issues that create great disadvantages for the memory mapping system. The major disadvantages of such large blocks are:

When a BAT fault (i.e., a "page fault" for a portion of memory which will be covered by a BAT entry) is encountered, the faulting process is suspended until all data for the large block has been brought from disk to memory and the translation is made valid for the block. Longer waits are associated with larger blocks.

While an entry is valid, all data must be present. Even if only a small portion of the data (or instructions) is needed, the entire block of main storage is allocated (and unavailable for other uses). Hardware complexity of BATs results in implementations with only a few BAT entries. In multi-user systems with hundreds or thousands of processes and where memory is a limited resource, operating systems are reluctant to allocate large contiguous blocks of real memory to each user process. Therefore, it is expected that operating systems will not generally allow BAT entries (as currently defined) to be used for user data/instructions.

It is difficult to provide coverage for areas which are not a power-of-two bytes because blocks must be stored on a power-of-two boundary. For example, to cover a 7 MB block, there are two choices: 1) Use an 8 MB entry and waste 1 MB of real storage. (This may not be permissible since the user can access storage beyond the expected 7 MB limit.), 2) Use three BAT entries (4 MB+2 MB+1 MB). This is a serious burden for current BAT hardware as most implementations have only a few (2–8) BAT entries.

Variable sized blocks, as are used in BATs, require more advanced memory management techniques from the operating system than do uniform sized pages. When a BAT fault occurs, the operating system must find (or create) an available block of contiguous real storage for the entire block, a process that may require the removal of some blocks already in memory.

Placing differing sized blocks in memory can leave fragments or splinters, i.e., small blocks of memory between other allocated blocks that are too small to be used by other blocks, creating inefficiency.

One major disadvantage of variable sized blocks and the use of BAT entries is that the problem of fragmentation is introduced. Each block must be stored on a block boundary, but because each entry in the BAT is allowed to have a different size block, placing a block in memory can leave "splinters", small blocks sandwiched between other allocated blocks that are too small to be used by other BAT entries. As a result, in systems which support large blocks, in addition to the common small page (4 KB–8 KB), the memory fragmentation problem which occurs from storing the various size blocks to real memory adds operating system complexity and often results in inefficiency and performance degradation of the virtual memory system.

It can be seen that there is a need for a virtual memory mapping system that provides translation coverage for large blocks of storage, while still providing sufficiently fine granularity to improve data input/output (I/O) efficiency and reduce memory allocation problems. Further, there is a need for such a system that substantially reduces the fragmentation of memory caused by the use of variable sized memory blocks. Such a virtual memory mapping system would dramatically increase the coverage of cached translation information, while avoiding the problems associated with coarser granularity and variable sized blocks.

SUMMARY OF THE INVENTION

According to the present invention, a method and system for memory management of pools of logical partitions for BAT and TLB entries in a data processing system is provided. An entry in an address translation buffer is created that is associated with a particular block of virtual memory comprised of a plurality of logical partitions that are grouped in one or more pools of logical partitions, wherein the size of each pool of logical partitions is equal to a preselected page size for real memory, and wherein the entry maps each pool of logical partitions to a page of real memory within a sector of real memory, wherein the size of the sector is a function of the size of the associated block of virtual memory. When a logical partition belonging to a particular pool of logical partitions within the particular block of virtual memory is received, the received logical partition is stored in the page of real memory mapped to the particular pool of logical partitions by the entry associated with the particular block of virtual memory.

A method and system for address translation mapping of memory management pools using logical partitions for BAT and TLB entries in a data processing system is also provided. A logical address for a memory reference to a selected logical partition of a particular block of virtual memory may be received, wherein a logical address includes a plurality of logical partition selection bits selecting one partition of the block of virtual memory. A physical address for the selected logical partition is compiled from an entry of an address translation buffer that is associated with the particular block of virtual memory, wherein the particular block of virtual memory is comprised of a plurality of logical partitions that are grouped in one or more pools of logical partitions, and wherein the size of each pool of logical partitions is equal to a preselected page size for real memory. The entry maps each pool of logical partitions to a page of real memory within a sector of real memory, wherein the size of the sector is a function of the size of the associated block of virtual memory. The physical address is compiled to address the page in real memory mapped to the pool of logical partitions containing the selected logical partition. The data of real memory in the selected logical partition at the compiled physical address is then retrieved.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
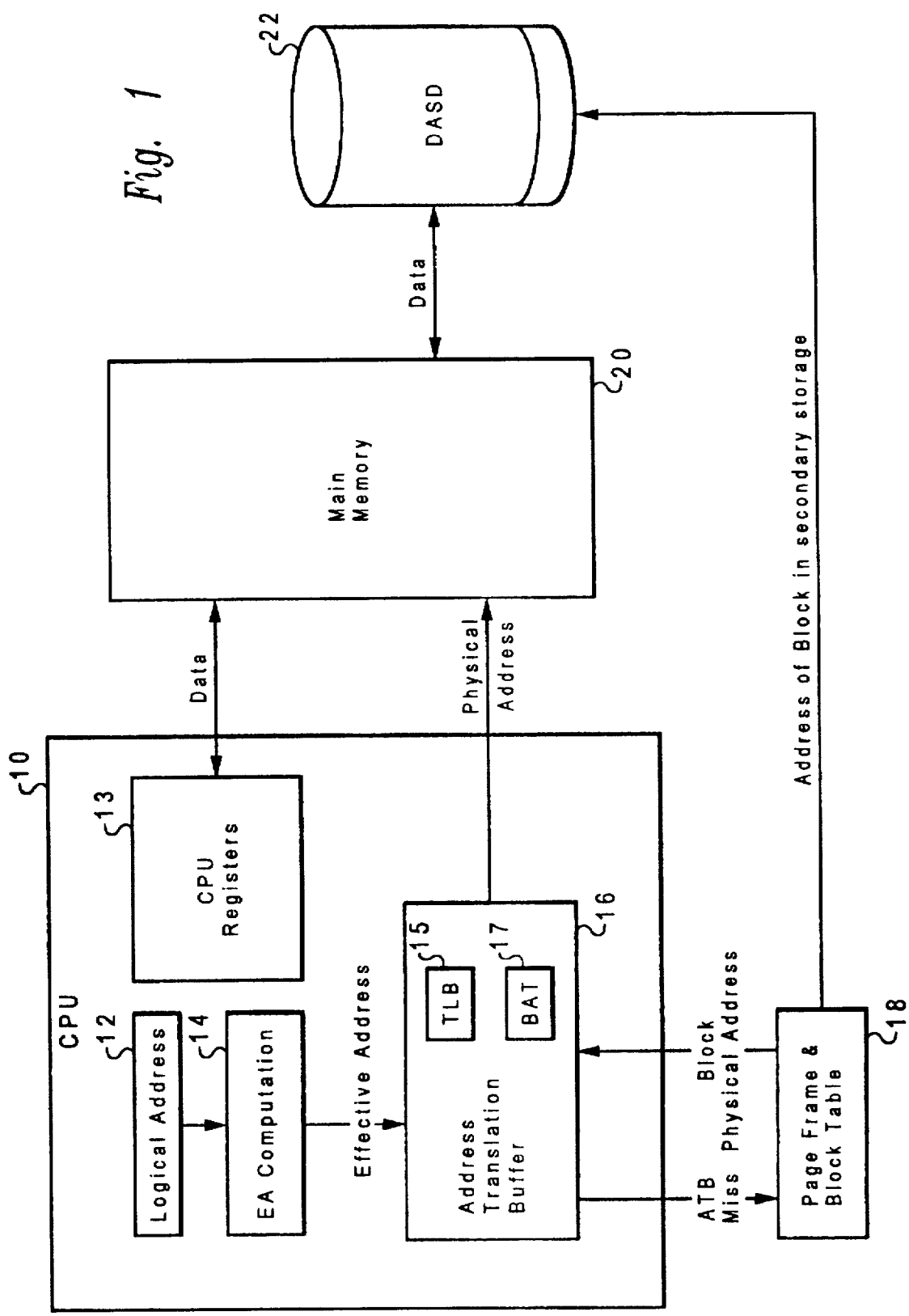
FIG. 1 depicts the virtual memory mapping system of a preferred embodiment of the present invention.

With reference now to the figures, and in particular with reference to FIG. 1, there is depicted the virtual memory mapping system of a preferred embodiment of the present invention. CPU 10 executes programs stored in the logical address space of direct access storage device (DASD) 22. When an instruction executed in CPU 10 generates a memory reference to an instruction (or data) not contained within the CPU registers 13, the memory reference must be retrieved from the data processing system's memory hierarchy.

The instruction's logical address 12 addresses a block of memory within the logical address space of the virtual memory system. The block of memory addressed by the logical address is partitioned into a plurality of logical partitions. An effective address is computed from the logical address by the effective-address computation hardware 14. During program execution, the effective-address computation hardware 14 converts the instruction's address specifications into effective addresses. These are the addresses that the CPU uses when referencing an instruction or variable, and in general they agree with the compiler's logical address (as will be assumed herein).

CPU 10 sends the effective address to Address Translation Buffer (ATB) 16. Address Translation Buffer 16 contains TLB 15 and BAT 17. Both the TLB and the BAT are searched for an entry for that effective address. According to the present invention, a memory reference for a particular instruction may be to a selected logical partition of the block of virtual memory addressed by the logical address. A logical address includes a virtual block number addressing the block of memory in virtual memory space, a plurality of logical partition selection bits selecting a partition of the block of virtual memory, and a real address offset. In the present embodiment, only block entries of BAT 17 may be logically partitioned, but it will be understood by those skilled in the art that the present invention of logical partitions is applicable to any ATB entry, such as large page TLB entries.

If Address Translation Buffer 16 has an entry for that effective address, it generates the corresponding physical address for the memory reference, which indicates the location of the memory reference within main memory 20. The physical address is transferred from Address Translation Buffer 16 to main memory 20, thereby accessing the memory reference in the physical address space and loading it from main memory 20 to CPU registers 13.

If Address Translation Buffer 16 has no entry for the effective address, the hardware (or software) consults the block (or page frame) table 18, using the virtual block number as an offset into the block table. (Although shown separately, block table 18 resides within main memory 20.) Block table 18 contains many more entries than Address Translation Buffer 16, but provides a much slower access time because it is contained in the slower main memory 20 and has a larger number of entries to search when making a comparison with the effective address. If the validity bit for the entry in the block table 18 corresponding to the virtual block number indicates the block is in memory, the hardware copies the block table entry into a new entry in the Address Translation Buffer 16 and uses the real (physical) block number in the block table entry to access the addressed data in main memory 20. Otherwise, the search of the block table for a memory reference to a block of memory that is not present in main memory 20 results in a block (or page) fault. A block fault is an exception that instructs the operating system to load into main memory the requested or demanded block and to update the block map (i.e., create an entry in the block table 18 and Address Translation Buffer 16). The retrieved data is then loaded from main memory 20 to CPU 10 to satisfy the memory access.

As will be appreciated, the memory hierarchy shown in FIG. 1 may also include a cache memory between main memory 20 and CPU 10 that provides a high-speed RAM with a faster access time to hold the memory references most recently used. As will be appreciated, Address Translation Buffer 16 would make a request for the translated memory access to the cache memory, so that if the cache holds a copy of the requested data, the cache will quickly process the request. Otherwise, the cache forwards the request to main memory 20.

Figure 2:
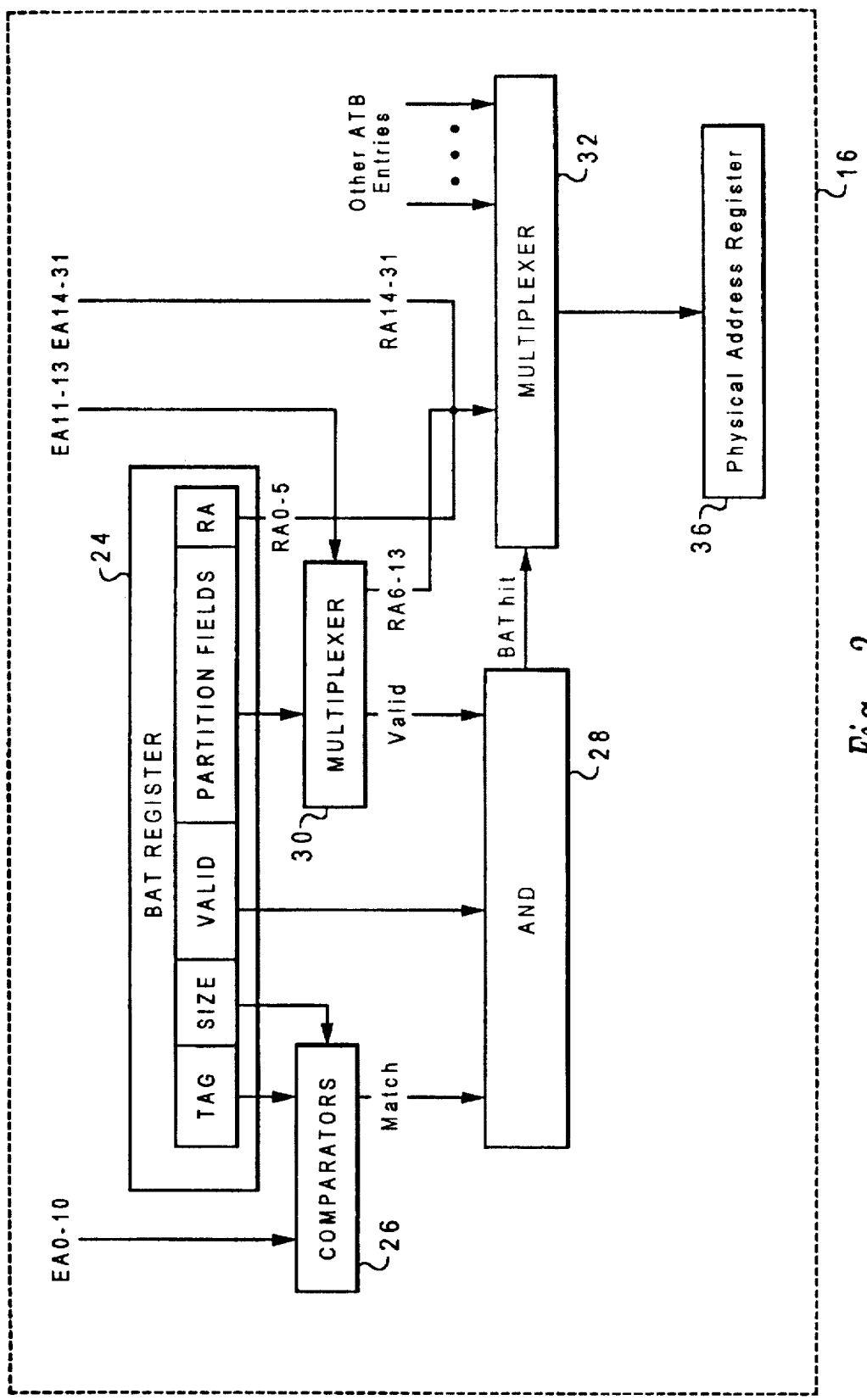
FIG. 2 shows a block diagram of an Address Translation Buffer, in accordance with a preferred embodiment of the present invention.

Referring now to FIG. 2, there is shown a block diagram of Address Translation Buffer 16, in accordance with a preferred embodiment of the present invention. Address Translation Buffer 16 has eight BAT registers. Each BAT register contains a BAT entry. FIG. 2 shows a single BAT register 24 and associated hardware 26–36. TLB 15 and the remaining seven BAT registers and associated hardware of Address Translation Buffer 16 are not shown. In alternative embodiments, Address Translation Buffer 16 can be equipped to provide address translation caching for any number of entries, including eight BATs, for a preferred embodiment. As will be appreciated by those skilled in the art, an alternative embodiment of the present invention would comprise large page TLB entries having partitioned pages; and the operation of such an embodiment would be substantially similar to the present embodiment, except for the variable sized blocks for the BAT entries, and so a description thereof is not repeated herein, but it will be understood that the scope of the present invention is intended to extend to such an embodiment.

As shown in FIG. 2, each BAT entry residing in a BAT register (including BAT register 24) of Address Translation Buffer 16 contains an effective address (TAG), block Size, block Valid bit, a plurality of Partition Fields, and a real address (RA). While the implemented TAG and RA fields need a sufficient amount of bits to handle the smallest allowable block, the number of bits used for a given translation is determined by the block size. For a block size of $2^N$ bytes, the TAG field contains the address of the first byte of the block in the effective/virtual address space (i.e., the virtual block number) for the translated block of memory, with the low-order N address bits removed. The block Size is an encoding of the size, in bytes, of the block of memory translated by the current entry. The block Valid bit specifies whether the contents of the BAT register represent a valid address translation for the referenced block of memory. If the block of memory referenced by the TAG in the entry is stored in main memory at the mapped real address, the block valid bit is set.

In a preferred embodiment, the ATB entry in BAT register 24 has eight Partition Fields, each corresponding to one of eight separate partitions of a 2 MB block of virtual memory translated by the particular ATB entry. Each Partition Field includes a partition valid bit, which is set when its corresponding partition of the block of memory is stored in the main memory, and eight real address bits addressing the partition within the sector of real memory defined by the RA field. In accordance with the present invention, a memory reference to a particular partition of a block of virtual memory will only result in the particular partition of the block of memory being stored to main memory and/or loaded into CPU registers. If a valid partition is stored in main memory, its corresponding partition valid bit in the Partition Field of the ATB entry is set. If that partition becomes invalid or is overwritten, the corresponding partition valid bit is reset.

The RA field defines a sector of real address space within which all partitions for this particular entry must be stored, a sector being defined as the legal range for the storage of an entry and the sector's size being dictated by the block size, the real address bits in the partition field, and number of partitions (i.e., sector size=block size*$2^R$/Number of partitions, where R=Number of bits in the RA field). The operating system can store a pool of logical partitions of the entry within the defined sector of real address space. A pool of logical partitions is formed by grouping a plurality of logical partitions that equal a page of real memory. (In the present embodiment, a pool equals a 1 MB page). The RA field contains the address of the first byte of the sector in the real address space of the main memory (i.e., the real block number), with the low-order (N+R−P) address bits removed, where the block size is $2^N$ bytes, the number of partitions in each Partition Field is $2^P$, and the number of real address bits contained in a partition's field is R. Although the Address Translation Buffer supports multiple-size blocks, in this embodiment of BAT register 24, a 2 MB BAT block size is assumed.

As seen in FIG. 2, an untranslated effective address EA0-31 is presented to Address Translation Buffer 16. This untranslated effective address is simultaneously presented to all (appropriate) ATB entries in Address Translation Buffer 16. In this embodiment, the effective and real addresses for a block of memory are 32-bit addresses. For a 2 MB BAT entry having eight partitions (N=21; P=3; R=8), the upper eleven bits (EA0-10), which specify a 2 MB block, of the effective address are compared by comparators 26 to the upper effective address bits (TAG 0-10) for the block corresponding to this ATB entry. If these addresses match, an indication is output to ANDgate 28, which forms the last stage of the tag-comparison function. The next three upper address bits (EA11-13) control multiplexer 30 to select the corresponding Partition Field for the referenced logical partition. These high-order partition selection bits address the referenced partition within the sector of memory mapped by this ATB entry. The low-order effective address bits (EA14-31) pass to multiplexer 32 unmodified to become real address bits RA 14-31.

The Partition Field selected by the partition selection bits outputs real address bits (RA6-13) that address the referenced partition within the sector of memory mapped by this ATB entry. The valid bit from the selected Partition Field indicates if the partition of memory referenced by the effective address is valid in main memory. This partition valid bit is output from multiplexer 30 into ANDgate 28 as another input into the last stage of the tag comparison function, as will be understood by those skilled in the art.

If there has been a match of the virtual block number for the received logical address and the virtual block number (TAG) stored in a valid register 24 (BAT register valid bit set), and further, if the logical partition selection bits in the received logical address indicate a valid partition in main memory, as indicated by the selected partition valid bit, the output of ANDgate 28 is set, indicating a BAT hit. The BAT hit signal for all ATB registers are connected to multiplexer 32 and control the input of the real address (RA0-31) for the entry. As seen in FIG. 2, a BAT hit for this BAT register selects the RA field (RA0-5), the Partition Field real address bits (RA6-13), and the address offset bits (RA14-31) for this entry as the output for multiplexer 32. This selected real address is stored to physical address register 36. The contents of physical address register 36 are concatenated to form the physical address that is transferred to the main memory to access the selected partition of the memory reference. If no BAT or TLB entry produces a ATB hit signal, an ATB fault occurs (i.e., an ATB miss).

As will be appreciated by those skilled in the art, the logical partition selections bits within the effective address will vary depending upon the number of partitions for the block of memory and the block size. Further, the operating system will set the fields of the ATB entry when loaded as required by the block size. Thus, the appropriate high-order effective address bits, as a function of the block size, are input into comparators 26 upon the receipt of a memory reference. Also, the appropriate logical partition selection bits of a received effective address, as a function of the block size, are used to provide the appropriate control of multiplexer 30. In addition, the selection of the referenced partition's valid bit by multiplexer 30 is an operation that can be overlapped with the existing and relatively lengthy TAG comparison. The selection of a partition, as opposed to a block (as is done in the prior art), requires no additional time to generate the RA fields and the BAT hit signal, since the Andgate 28 can be implemented as one additional bit in the comparators 26.

As can be seen, the present invention provides a method and system for refining the granularity of a large block of memory by introducing logical partitions of the block and associating a valid bit with each partition. As memory references are satisfied, the system validates partitions, rather than an entire ATB entry. If a new ATB entry must be created within Address Translation Buffer 16 to satisfy a fault (i.e., the initial fault for the block), the partition will be backed by real storage in the main memory and an ATB entry is created with only the one valid bit corresponding to the particular selected partition of the block set. If the corresponding ATB entry already existed when the fault occurs (i.e., subsequent faults for the block), the faulting partition would simply be backed up by real storage in the main memory and the partition's valid bit would be set in the ATB entry. For additional performance, the operating system may chose to fetch-ahead additional partitions of the block simultaneously with, or after the immediate memory reference.

While address translation mapping of logical memory partitions substantially enhances the overall memory I/O performance, the use of logical partitions may result in substantial memory fragmentation. Consequently, the introduction of logical memory partitions for address translation mapping presents a further problem of memory fragmentation that may add to operating system complexity and result in substantial performance degradation. The memory fragmentation problem occurs because entries in the address translation buffer can have differing sizes of block entries, creating portions of memory between the blocks that cannot be used. Also, there are holes created within a block when only some partitions are valid. Further, although the present invention allows a single logical partition to be stored in real memory without requiring the entire block be stored, the operating system potentially is constrained to store a logical partition at an address boundary corresponding to the logical partition's size and at a specific relative location within the block of real address space. As will be appreciated, the storing of differing sizes of logical partitions within differing blocks of real memory will generate splinters of memory between logical partitions that are wasted, resulting in inefficiencies. The present invention solves this problem of memory fragmentation by creating memory management pools of the logical partitions for ATB entries.

Figure 3:
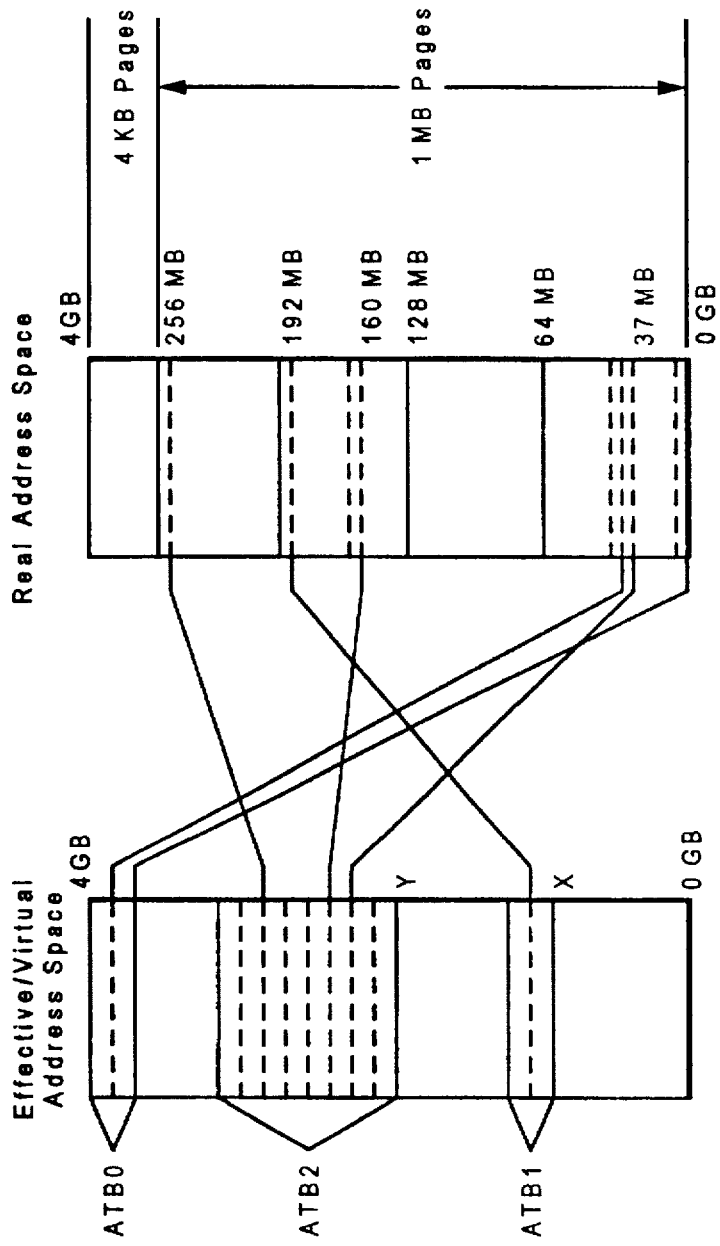
FIG. 3 shows a memory map from the virtual memory space to the real address space as is performed by the method and system for address translation mapping of memory management pools using logical partitions for the ATB entries in the data processing system of the present invention, in accordance with a preferred embodiment thereof.

Referring to FIG. 3, there is shown a memory map from the virtual memory space to the real address space as is performed by the method and system for address translation mapping of memory management pools using logical partitions for the ATB entries in the data processing system of the present invention, in accordance with a preferred embodiment thereof. FIG. 3 graphically shows the address translation mapping of three ATB entries, ATB0, ATB1, and ATB2, that are contained in registers of address translation buffer 16. These three ATB entries are shown in the table of FIG. 4.

As shown in FIG. 3, the solid lines in the virtual address space indicate boundaries of a block of virtual memory mapped by a particular ATB entry. Dashed lines in the virtual address space indicate a 1 MB page boundary within a given block of virtual memory. The first 256 MB region of the 4 gigabyte (GB) real address space is allocated for 1 MB pages. The remainder of the 4 GB of real address space is stored using a separate translation lookaside buffer (TLB 15) that stores 4 KB pages. The solid lines in the real address space indicate sector boundaries for 64 MB and 256 MB sectors within real memory in which 2 MB and 8 MB ATB entry partitions can be mapped. Dashed lines in the real address space indicate a 1 MB page boundary within a given sector of real memory. By forcing the real address space to be divided into standard size pages (or, as in this case, splitting the real address space into two domains, each having its own standard page size) memory fragmentation is substantially reduced. As will be appreciated, the real address space mapped by the ATB of the present invention can be subdivided into any power of two page size and the present invention is not limited to 1 MB pages.

Figure 4:
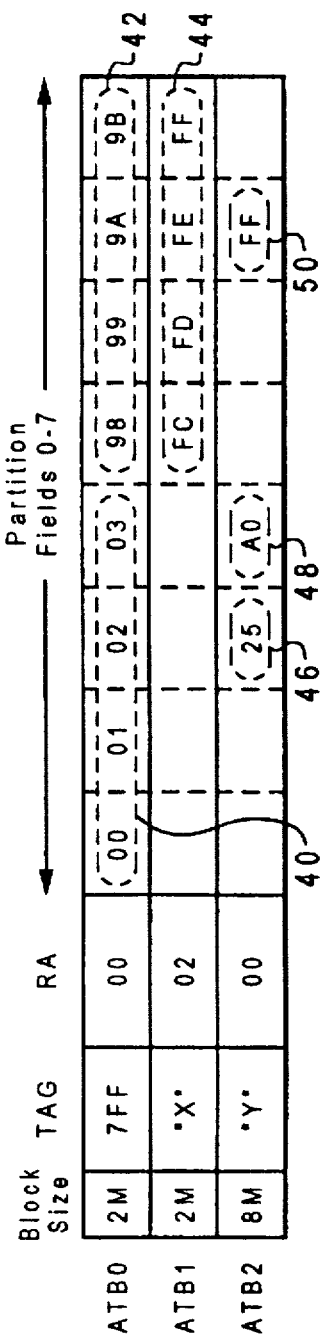
FIG. 4 shows eight logical partitions of a block of virtual memory mapped by an entry in the ATB, in accordance with a preferred embodiment of the present invention.

As shown in FIG. 4, eight logical partitions of a block of virtual memory are mapped by an entry in the ATB. ATB0 covers the upper 2 MB of virtual space. This results in a 11-bit TAG for ATB0, which for this example is "7FF$_{16}$". Address Translation Buffer 16 divides the block of virtual memory mapped by ATB0 into eight logical partitions, each partition being 256 KB (i.e., 2 MB/8). Thus, for 256 KB logical partitions, the low order 18 bits of virtual address are passed through to the physical address register to become RA14-31. Since in a preferred embodiment each logical partition field will provide eight bits of the real address per partition, the upper 6 bits of the real address are provided from the RA field of ATB0. Consequently, the upper address bits RA0-5 are the same for all partitions of ATB0. In this way, the RA field of ATB0 defines a sector of real address space within which all partitions for this particular entry must be stored, a sector being defined as the legal range for the storage of an entry and the sector's size being dictated by the block size, number of real address bits per partition, and number of partitions (i.e., sector size=block size*$2^{RA_{PF}}$/ Number of partitions, where $RA_{PF}$=Number of bits in the RA field). In the example of FIG. 4, the RA field of ATB0 has 6 zero bits for the upper real address bits (i.e., RA0–5= $00_{16}$). Therefore, all of the partitions of ATB0 can be backed only from real partitions in the low 64 MB sector of the real address space (i.e., for a 32 bit physical address, the upper 6 real address bits define 64 MB sectors of the 4 GB real address space).

As seen in FIG. 4, each entry has eight partition fields (Partition Fields 0–7), each holding eight bits of the real address for a corresponding logical partition. As disclosed in a preferred embodiment of the present invention, the operating system uses pools of logical partitions that are grouped into blocks that equal the page size of the real memory. In the present embodiment, the real address space (for the BAT) is allocated for 1 MB pages to be stored within the real memory. Thus, logical partitions within a particular block of virtual memory are grouped into 1 MB pools of logical partitions. The first four partitions of ATB0 are valid (illustrated here by having non-blank entries in the fields, although in a preferred embodiment this would be indicated by a valid bit) and have adjacent address values ($00_{16}$, $01_{16}$, $02_{16}$, and $03_{16}$). According to the present invention, these four logical partitions are formed into a pool 40 of logical partitions that is stored in real memory as a 1 MB page (i.e., four 256 KB logical partitions mapped to adjacent real partitions forms a 1 MB page). In a similar manner, the upper four logical partitions of ATB0 form a pool 42 of four 256 KB logical partitions that are mapped to four adjacent 256 KB real partitions to form a 1 MB page.

The physical address for each pool of logical partitions within an ATB entry is formed by the RA field concatenated with the eight bits of each partition field (giving the appropriate weight to each bit for an entry's block size). As explained, with an RA field loaded with "00", both pools 40, 42 of ATB0 can be backed only from real partitions in the low 64 MB sector of the real address space. As will be appreciated, the operating system can store both pools of logical partitions at any 1 MB page of the real address space within the first 64 MB sector of real address space. For this example, the lower 1 MB pool 40 of logical partitions for ATB0 maps to the lower 1 MB block of real address space, starting at address "00". Pool 42 of logical partitions is stored starting at address "$98_{16}$" within the RA sector. As can be seen from FIG. 3, the upper pool 42 of logical partitions for ATB0 is mapped to the 1 MB block starting at a 38 MB boundary of real address space ($98_{16}$*256 KB=38 MB).

As seen in FIG. 4, ATB1 maps a 2 MB block of virtual memory starting from a TAG address "X", which must be on a 2 MB boundary. The RA field contains 6 bits addressing "$02_{16}$", which addresses the third 64 MB sector of the real address space. Therefore, the two 1 MB pools of logical partitions for this block of virtual memory are stored within this third 64 MB sector of real memory. In this example, the first four 256 KB logical partitions that form the lower pool of logical partitions for ATB1 are not currently valid. The upper four logical partitions of ATB1 form the upper pool 44 of logical partitions that map to a 1 MB page of real address space starting at address "$FC_{16}$", which is at the 191 MB boundary (i.e., $02_{16}$*64 MB+$FC_{16}$*256 KB=191 MB).

ATB2 maps an 8 MB block of virtual memory starting at TAG address "Y", which must be on an 8 MB boundary of the virtual address space. Since each logical partition of the eight logical partitions of ATB2 has a partition size of 1 MB, the lower order 20 bits of the 32-bit real address provides a real address offset into each logical partition. Each partition field provides 8 bits of the real address, leaving the RA field to provide a 4-bit sector number. Consequently, for an 8 MB entry in the ATB, the RA field designates a 256 MB sector of real memory within which each logical partition of the 8 MB ATB entry is stored. As shown in FIG. 4, the sector number for ATB2 is "$00_{16}$", indicating that the logical partitions of ATB2 are stored within the first 256 MB sector of real memory.

As shown in the example of FIG. 4, only three logical partitions of ATB2 are valid and backed by real memory. Since each logical partition is equal to a page, each partition comprises its own pool of logical partitions for ATB2. The third pool 46 (Partition Field 2) of ATB2 maps to the 1 MB page of real space starting at address 37 MB (i.e., 0*256 MB+$25_{16}$*1 MB=37 MB). Similarly, the fourth pool 48 and seventh pool 50 (Partition Fields 3, 6) of ATB2 are mapped to 1 MB pages of real address space starting at 160 MB (i.e., 0*256 MB+$A0_{16}$*1 MB=160 MB) and 255 MB (i.e., 0*256 MB+$FF_{16}$*1 MB=255 MB), respectively.

Although this invention has been described in terms of 1 MB pages of real memory, it is equally applicable to other page sizes, such as 256 KB or 2 MB. As will be appreciated, pools of logical partitions are formed to create a contiguous space of memory equal to the page size. Consequently, the number of logical partitions in each pool for a given entry will be a function of the logical partition size and the page size. Although the invention has been described in terms of 2 MB and 8 MB block sizes for each ATB entry, it is equally applicable to other block sizes for the block of virtual memory mapped by the given ATB entry. It will be appreciated that regardless of the actual partition size stored in an entry, logical partitions are pooled in pages so that real storage is managed as uniform pages of real memory. As a result, the operating system complexity associated with memory fragmentation is substantially reduced.

As will be appreciated by those skilled in the art, significant advantages are created by the present invention's method and system of introducing logical partitions and memory management pools for ATB entries. First, the logical partitioning of the address translation mapping can be provided in either existing BAT or TLB technologies. Additionally, the response time of I/O for a fault is decreased because only a subset, a single partition, of the block is required. The faulting process may thus resume after a portion of the data (or instructions) has been retrieved, rather than waiting for the entire block covered by the ATB entry. Further, the amount of contiguous real storage required to immediately satisfy a ATB fault is reduced to the size of the partition. Additionally, the real storage associated with non-valid partitions can be made available to other processes until needed by the process. If the other portions of the block are not accessed during some interval, additional savings may result by eliminating unnecessary I/O. Still further, because the granularity of real memory which must be reserved for a particular memory access is reduced, address translation caching of user address space is more acceptable to the system. Also, the present invention much more efficiently accommodates memory references to blocks of memory which are not a power-of-two in size (such as 3 MB or 5 MB). Because the present invention requires that only selected partitions be stored at a real address in main memory, the entire power-of-two block is not required to be saved in main memory. Therefore, only a single ATB entry is required for this particular memory reference, and further, an entire power-of-two block of main memory does not have to be reserved for this ATB entry.

As a further advantage, the present invention gives the operating system more flexibility in the assignment of virtual partitions to real partitions by providing a portion of the logical partition's real address within an ATB entry that may be pooled with other partitions to form a uniform sized page of real memory. Such flexibility allows the partitions to be managed as uniform sized pages, alleviating many of the fragmentation problems that result from allowing independent loading and storing of logical partitions and blocks of virtual memory. As can be seen, the operating system can now create pools of logical partitions that may have a different number of logical partitions per pool but that are of equal size in real space, regardless of the particular ATB entry's actual block size. In so doing, the operating system can logically and efficiently store pools of logical partitions to real memory without creating splinters or fragmentation of the real memory. Also, note that while the preferred embodiment showed only two regions of 4 KB and 1 MB pages being supported, the operating system can support other page sizes and additional regions of real space having different page sizes, so that the present invention will operate with real space having two or more regions of differing pages.

Although the present invention has been described in terms of 32-bit address spaces, it is equally applicable to other sizes, such as 64-bit addresses. Moreover, although this invention has been described in terms of eight partitions, it is equally applicable to other sizes, such as two or four partitions. Although the present invention has been described in terms of 1 KB and 1 MB pages being supported, is equally applicable to other page sizes. Moreover, the present invention is equally applicable to TLB or BAT facilities. As will be appreciated, the operating system would need to support the logical partitioning as used in the present invention. Exploiting the features and advantages of the present invention requires that the operating system perform the manipulations of the logical partition selection bits in the ATB entry and allow for additional ATB faults for partitions that are not yet valid.

In summary, the present invention has substantially enhanced the address translation mapping and memory input/output performance by providing logical partitioning of address translation buffer entries, and further has substantially alleviated the fragmentation problems associated with variable sized blocks by providing memory management pools of logical partitions to allow storage of uniform page sizes to real memory. While the invention has been particularly shown and described with reference to a preferred embodiment, it will be understood by those skilled in the art that various changes in form and detail may be made therein without departing from the spirit and scope of the invention.

What is claimed is:

1. A method for memory management of pools of logical partitions for BAT and TLB entries in a data processing system, the method comprising the steps of:

creating an entry in an address translation buffer that is associated with a particular block of virtual memory comprised of a plurality of logical partitions that are grouped in one or more pools of logical partitions, wherein the size of each pool of logical partitions is equal to a preselected page size for real memory, and wherein the entry maps each pool of logical partitions to a page of real memory within a sector of real memory, wherein the size of the sector is a function of the size of the associated block of virtual memory, said created entry including a virtual block number for the associated block in a virtual address space that is dependent on the size of the block of virtual memory, a sector number addressing a sector in the real memory within which the one or more pools of logical partitions are addressed, and a plurality of logical partition fields, each logical partition field being associated with a logical partition of a pool of the one or more pools of logical partitions and containing a plurality of partition address bits that map the associated logical partition within the sector of real memory;

receiving a logical partition belonging to a particular pool of logical partitions within the particular block of virtual memory; and storing the received logical partition in the page of real memory mapped to the particular pool of logical partitions by the entry associated with the particular block of virtual memory.

2. A method for memory management of pools of logical partitions for BAT and TLB entries in a data processing system according to claim 1, further comprising the step of:

updating the entry for the particular block of virtual memory such that a logical partition field associated with the received logical partition includes a plurality of partition address bits addressing the stored logical partition within the particular pool of logical partitions.

3. A method for memory management of pools of logical partitions for BAT and TLB entries in a data processing system according to claim 1, wherein the step of storing comprises storing the received logical partition at a physical address in the real memory that is within the sector addressed by the sector number in the entry associated with the particular block of virtual memory and addressed by the plurality of partition address bits associated with the received logical partition.

4. A method for memory management of pools of logical partitions for BAT and TLB entries in a data processing system according to claim 1, wherein each logical partition field includes a partition valid bit, wherein the partition valid bit is set for an entry when the associated logical partition is valid within the real memory, regardless of whether other logical partitions in said particular block of virtual memory are valid in said real memory.

5. A method for memory management of pools of logical partitions for BAT and TLB entries in a data processing system according to claim 1, wherein every pool of logical partitions for every entry created in the translation address buffer is equal in size to a preselected page size of real memory.

6. A method for memory management of pools of logical partitions for BAT and TLB entries in a data processing system according to claim 1, wherein more than one pool of logical partitions for a given entry is stored in a contiguous space of real memory.

7. A method for memory management of pools of logical partitions for BAT and TLB entries in a data processing system according to claim 1, wherein the size of every logical partition of a given pool of logical partitions is a function of the size of the associated block of virtual memory.

8. A system for memory management of pools of logical partitions for BAT and TLB entries in a data processing system, comprising:

means for creating an entry in an address translation buffer that is associated with a particular block of virtual memory comprised of a plurality of logical partitions that are grouped in one or more pools of logical partitions, wherein the size of each pool of logical partitions is equal to a preselected page size for real memory, and wherein the entry maps each pool of logical partitions to a page of real memory within a sector of real memory, wherein the size of the sector is a function of the size of the associated block of virtual memory, said created entry including a virtual block number for the associated block in a virtual address space that is dependent on the size of the block of virtual memory, a sector number addressing a sector in the real memory within which the one or more pools are addressed, and a plurality of logical partition fields, each logical partition field being associated with a logical partition of a pool of the one or more pools of logical positions and containing a plurality of partition address bits that address the associated logical partition within the sector of real memory;

means for receiving a logical partition belonging to a particular pool of logical partitions within the particular block of virtual memory; and means for storing the received logical partition in the page of real memory mapped to the particular pool of logical partitions by the entry associated with the particular block of virtual memory.

9. A system for memory management of pools of logical partitions for BAT and TLB entries in a data processing system according to claim 8, further comprising means for:

updating the entry for the particular block of virtual memory such that a logical partition field associated with the received logical partition includes a plurality of partition address bits addressing the stored logical partition within the particular pool of logical partitions.

10. A system for memory management of pools of logical partitions for BAT and TLB entries in a data processing system according to claim 8, wherein the means for storing comprises means for storing the received logical partition at a physical address in the real memory that is within the sector addressed by the sector number in the entry associated with the particular block of virtual memory and addressed by the plurality of partition address bits associated with the received logical partition.

11. A system for memory management of pools of logical partitions for BAT and TLB entries in a data processing system according to claim 8, wherein each logical partition field includes a partition valid bit, wherein the partition valid bit is set for an entry when the associated logical partition is valid within the real memory, regardless of whether other logical partitions in said particular block of virtual memory are valid in said real memory.

12. A system for memory management of pools of logical partitions for BAT and TLB entries in a data processing system according to claim 8, wherein every pool of logical partitions for every entry created in the translation address buffer is equal in size to a preselected page size of real memory.

13. A system for memory management of pools of logical partitions for BAT and TLB entries in a data processing system according to claim 8, wherein more than one pool of logical partitions for a given entry is stored in a contiguous space of real memory.

14. A system for memory management of pools of logical partitions for BAT and TLB entries in a data processing system according to claim 8, wherein the size of every logical partition of a given pool of logical partitions is a function of the size of the associated block of virtual memory.

* * * * *